United States Patent
Sugino et al.

(10) Patent No.: US 8,265,002 B2
(45) Date of Patent: Sep. 11, 2012

(54) REPEATER DEVICE AND REPEATER SYSTEM

(75) Inventors: Heiichi Sugino, Shinagawa (JP); Fujio Seki, Shinagawa (JP); Masato Ozawa, Shinagawa (JP); Yutaka Inomoto, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1190 days.

(21) Appl. No.: 12/078,342

(22) Filed: Mar. 28, 2008

(65) Prior Publication Data

US 2008/0240015 A1    Oct. 2, 2008

(30) Foreign Application Priority Data

Mar. 29, 2007  (JP) ................................. 2007-088878

(51) Int. Cl.
*H04B 7/14*    (2006.01)

(52) U.S. Cl. ........................... 370/315; 327/105; 398/11

(58) Field of Classification Search .................. 370/315, 370/400–402; 398/11; 327/105
See application file for complete search history.

(56) References Cited

U.S. PATENT DOCUMENTS

| 3,978,284 | A  | * | 8/1976 | Yoshino et al. ................. | 348/24 |
| 4,074,127 | A  | * | 2/1978 | Mochida et al. ................ | 398/11 |
| 2003/0081120 | A1 | * | 5/2003 | Klindworth ................... | 348/143 |
| 2007/0159526 | A1 | * | 7/2007 | Abe .............................. | 348/65 |
| 2010/0020179 | A1 | * | 1/2010 | Horan et al. ................... | 348/181 |
| 2011/0121866 | A1 | * | 5/2011 | Suzuki .......................... | 327/105 |

FOREIGN PATENT DOCUMENTS

JP           9-219803           8/1997

* cited by examiner

*Primary Examiner* — Phuc Tran
(74) *Attorney, Agent, or Firm* — Staas & Halsey LLP (57) ABSTRACT

A repeater device that is placed between a transmission device connected to a server device and a reception device connected to a console device that controls the server device. The repeater device repeats a signal between the transmission device and the reception device, and includes an equalizer amplifier that amplifies a signal that is received from the transmission device or another repeater device.

5 Claims, 11 Drawing Sheets

COMMUNICATION
CABLE : R ────────────┐
                      └──────────────── ⎫
FIG. 8B                                  ⎬ VIDEO SIGNALS
                                         ⎭
COMMUNICATION
CABLE : G ──────────────────┐
                            └──────────

FIG. 8C

DETECTION SIGNAL ─────────┌──┐
                          │  │
                          ┘  └──────────

FIG. 8D

INTEGRATOR OUTPUT ─────────────┐↕ V   THIS VOLTAGE IS
                              /         MEASURED
─────────────────────────────/──────────

REPEATER DEVICE AND REPEATER SYSTEM

BACKGROUND OF THE INVENTION

1. Field of the Invention

The present invention generally relates to a repeater device that repeats a connection between a transmission device placed on the side of a server device and a reception device placed on the side of a console device formed with a monitor, a keyboard, a mouse, and the likes.

2. Description of the Related Art

In recent years, attention has been drawn to the technique by which a user can control a server device located several hundreds of meters away from the user. By this technique, a remote unit is placed between the server device located in a remote place, and a console device that is located near the user and is formed with a keyboard, a mouse, a display, and the likes. With this arrangement, remote control can be performed on the server device. The remote unit includes a transmission device placed on the side of the server device and a reception device placed on the side of the console device. The transmission device and the console device are connected to each other with a LAN (Local Area Network) cable.

Japanese Unexamined Patent Publication No. 9-219803 discloses a digital address display in which a digital video signal, a horizontal synchronization signal, and a vertical synchronization signal are transmitted through separate cables from one another, and there is a switch provided for correcting the difference in the delay amount among the cables.

However, there is a limit to how far away the remote unit can be located. If two or more remote units are connected in a cascade fashion, the connection distance can be made longer, though this makes the entire system costly. Also, in the case where two or more remote units are connected in a cascade fashion, an AC power source is required at each repeater point, and the placement of the remote units, becomes more restricted. Further, it is troublesome to adjust the image quality for each of the remote units.

SUMMARY OF THE INVENTION

It is therefore an object of the present invention to provide a repeater device and a repeater system in which the above disadvantages are eliminated.

A more specific object of the present invention is to provide a repeater device and a repeater system that can have a longer connection distance between the server device and the console device.

According to an aspect of the present invention, there is provided a repeater device that is placed between a transmission device connected to a server device and a reception device connected to a console device that controls the server device, the repeater device repeating a signal between the transmission device and the reception device, the repeater device including an equalizer amplifier that amplifies a signal that is received from the transmission device or another repeater device. With this arrangement, a signal can be repeated from the server device to the console device, without signal attenuation. Thus, the connection distance between the server device and the console device can be made longer.

According to another aspect of the present invention, there is provided a repeater system that is placed between a transmission device connected to a server device and a reception device connected to a console device that controls the server device, the repeater system repeating a signal between the transmission device and the reception device, the repeater system including: a second repeater device that includes an equalizer amplifier that amplifies a signal received from the transmission device or another device, and a separating unit that separates a direct current from a video signal that is output from the server device, the direct current being received through a cable used for transmitting the video signal; and a first repeater device that includes an equalizer amplifier that amplifies a signal received from the second repeater device, a skew adjusting unit that adjusts a skew of the video signal transmitted through a plurality of cables, and a power supply unit that supplies the direct current to the second repeater device with the use of the cable used for transmitting the video signal, upon receipt of a power supply from a power source device.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of a preferred embodiment of the present invention, with reference to the accompanying drawings.

Embodiment

Figure 1:
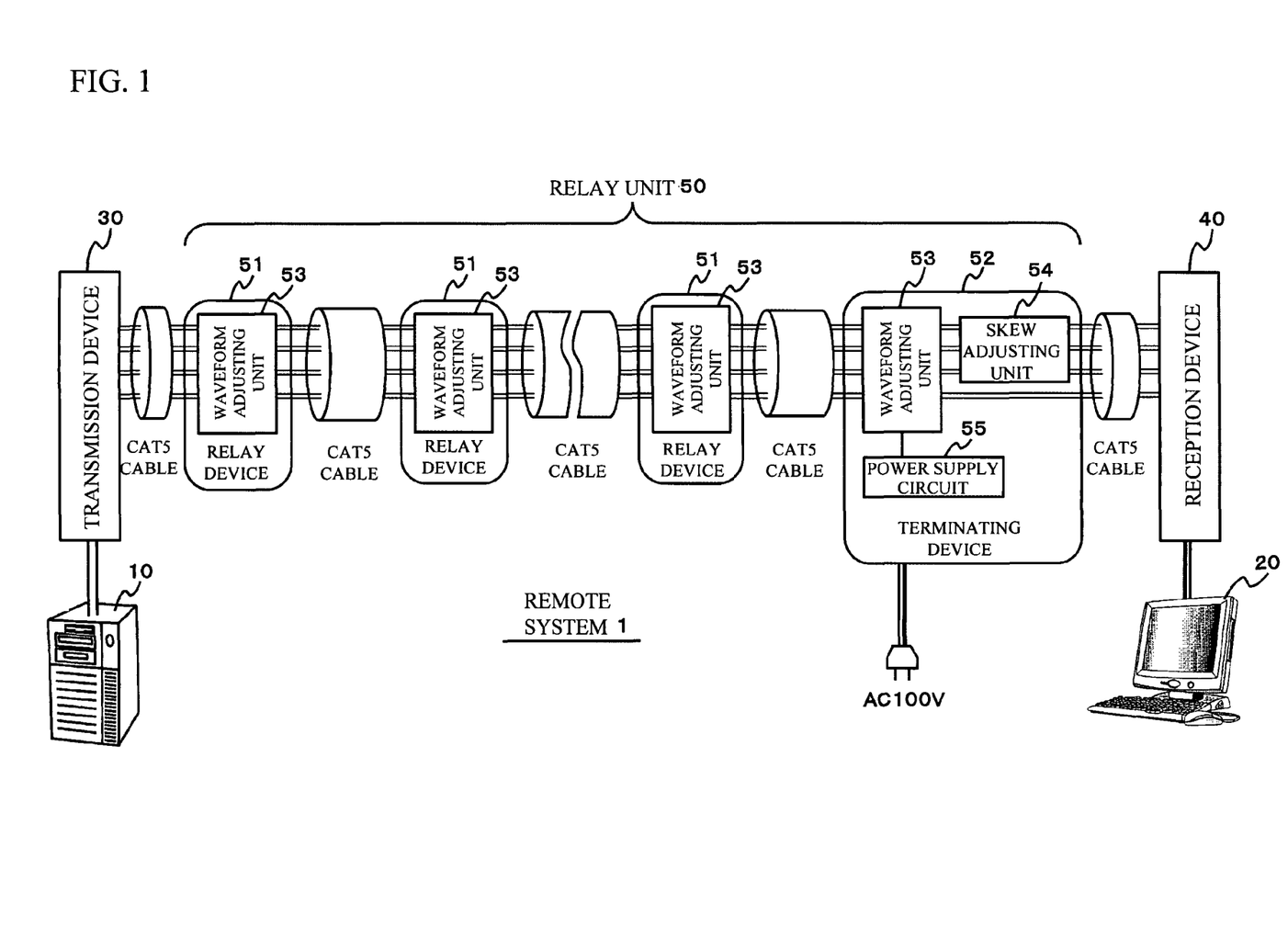
FIG. 1 illustrates the structure of a remote system of the present invention.

Referring first to FIG. 1, the structure of a remote system 1 is described. As shown in FIG. 1, the remote system 1 of this embodiment has a transmission device 30 as a remote unit, a repeater unit 50, and a reception device 40 that are interposed between a server device 10 and a console device 20 such as a display, a keyboard, a mouse, and the likes.

LAN cables connect the transmission device 30 and the repeater unit 50 to each other, the components in the repeater unit 50 to one another, and the repeater unit 50 and the reception device 40 to each other. The LAN cables may be CAT5 cables or CAT5e cables, for example. Using those cables, RGB video signals (RGB), horizontal synchronization signals (HFSYNC), vertical synchronization signals (VSYNC), and signals that are input through the keyboard or mouse (operation signals) are transmitted and received.

Figure 2A:
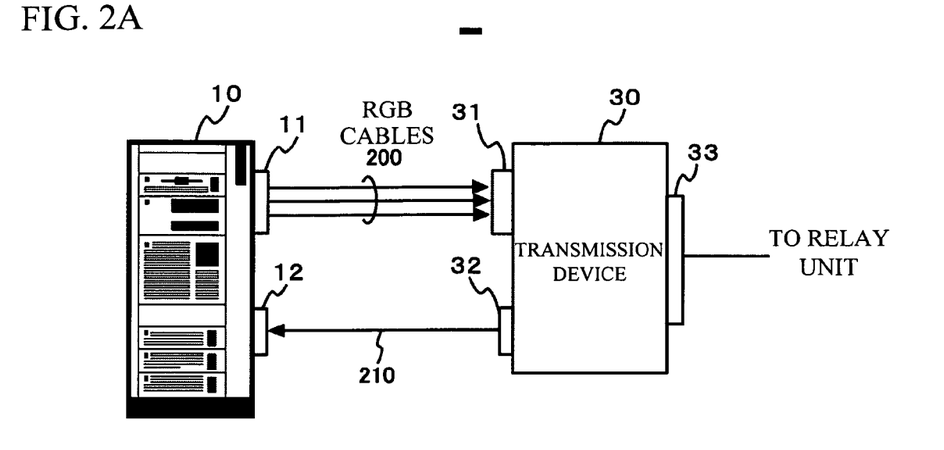
FIG. 2A shows the connection of the server device and the transmission device.

The transmission device 30 has a VGA (Video Graphics Array) connector 31 as a display connector for inputting video signals (RGB), horizontal synchronization signals, and vertical synchronization signals from the server device 10 formed with a personal computer, a work station, some other information processing device, or the like (see FIG. 2A).

The transmission device 30 also has a keyboard/mouse connector 32 for transmitting the keyboard/mouse operation signals that are input via the reception device 40 to the server device 10 (see FIG. 2A). The keyboard/mouse connector 32 may be a connector that can be used for connecting a regular keyboard and mouse, such as a PS/2 connector, a USB (Universal Serial Bus) connector, some other serial connector, or the like.

The transmission device 30 has a network interface 33, and transmit the above described signals to the repeater unit 50 and receive signals from the repeater unit 50 via the network interface 33.

Like a regular information processing device, the server device 10 has a VGA connector 11 for outputting video signals (RGB), and a keyboard/mouse connector 12 for inputting operation signals from the keyboard or mouse (see FIG. 2A). The VGA connector 11 of the server device 10 and the VGA connector 31 of the transmission device 30 are connected to each other with RGB cables 200, and video signals are transmitted from the server device 10 to the transmission device 30. The keyboard/mouse connector 12 of the server device 10 and the keyboard/mouse connector 32 of the transmission device 30 are connected to each other with a cable 210, and keyboard/mouse operation signals are transmitted from the transmission device 30 to the server device 10.

Figure 2B:
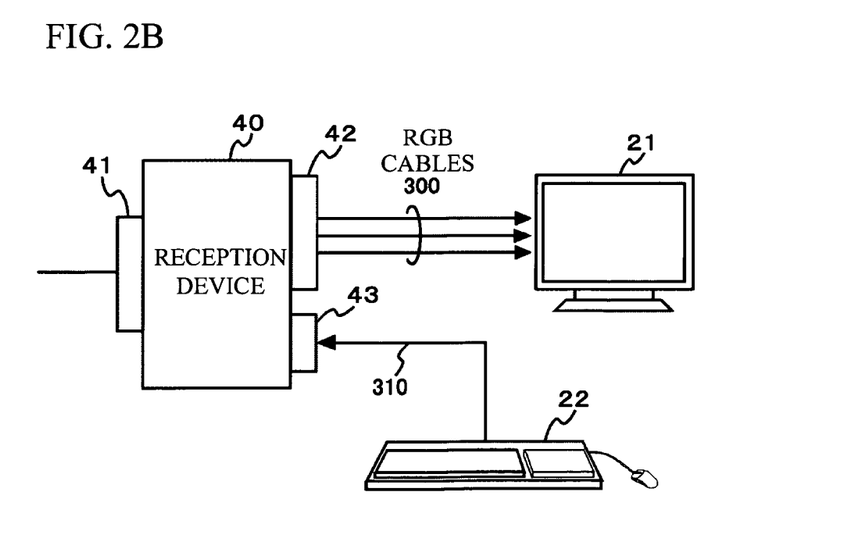
FIG. 2B shows the connection between the reception device and the console device.

The reception device 40 has a VGA (Video Graphics Array) connector 42 for outputting video signals (RGB), horizontal synchronization signals, and vertical synchronization signals to the display (see FIG. 2B). RGB cables 300 attached to the display 21 are connected to the VGA connector 42.

The reception device 40 also has a keyboard/mouse connector 43 for inputting operation signals from the keyboard or mouse (see FIG. 2B). A cable 310 attached to the keyboard/mouse 22 is connected to the keyboard/mouse connector 43.

Like the transmission device 30, the reception device 40 has a network interface 41 (see FIG. 2B), and receives the above described signals from the repeater unit 50 via the network interface 41 and transmits signals to the transmission device 30 via the repeater unit 50.

Next, the structure of the repeater unit 50 is described. As shown in FIG. 1, the repeater unit 50 includes repeater devices 51 that repeat video signals to another device, and a terminating device 52 that is provided on the terminating side of repeating the video signals.

Each of the repeater devices 51 and the terminating device 52 has a waveform adjusting unit 53, and amplifies and corrects the amplitude of a signal attenuated through a communication. Each of the repeater devices 51 and the terminating device 52 then repeats the amplified and corrected signal to the device of the next stage. Each of the repeater devices 51 and the terminating device 52 also has the function of repeating a synchronization signal superimposed on a video signal that is output from the server device 10. Each of the repeater devices 51 and the terminating device 52 also inputs a keyboard/mouse operation signal, and outputs the operation signal as it is to the device of the next stage.

Figure 3:
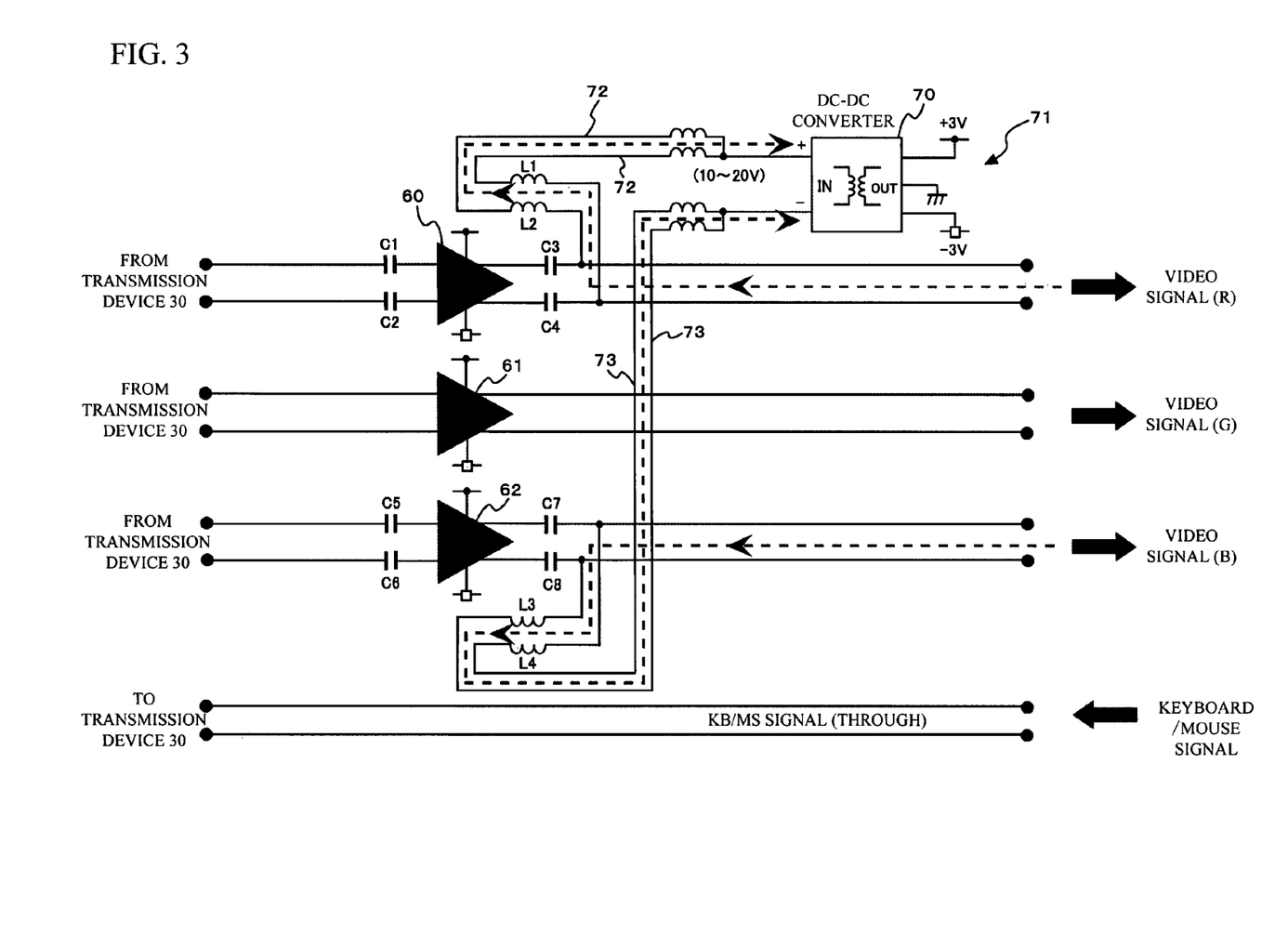
FIG. 3 illustrates the structure of the repeater device that inputs signals directly from the transmission device.
Figure 4:
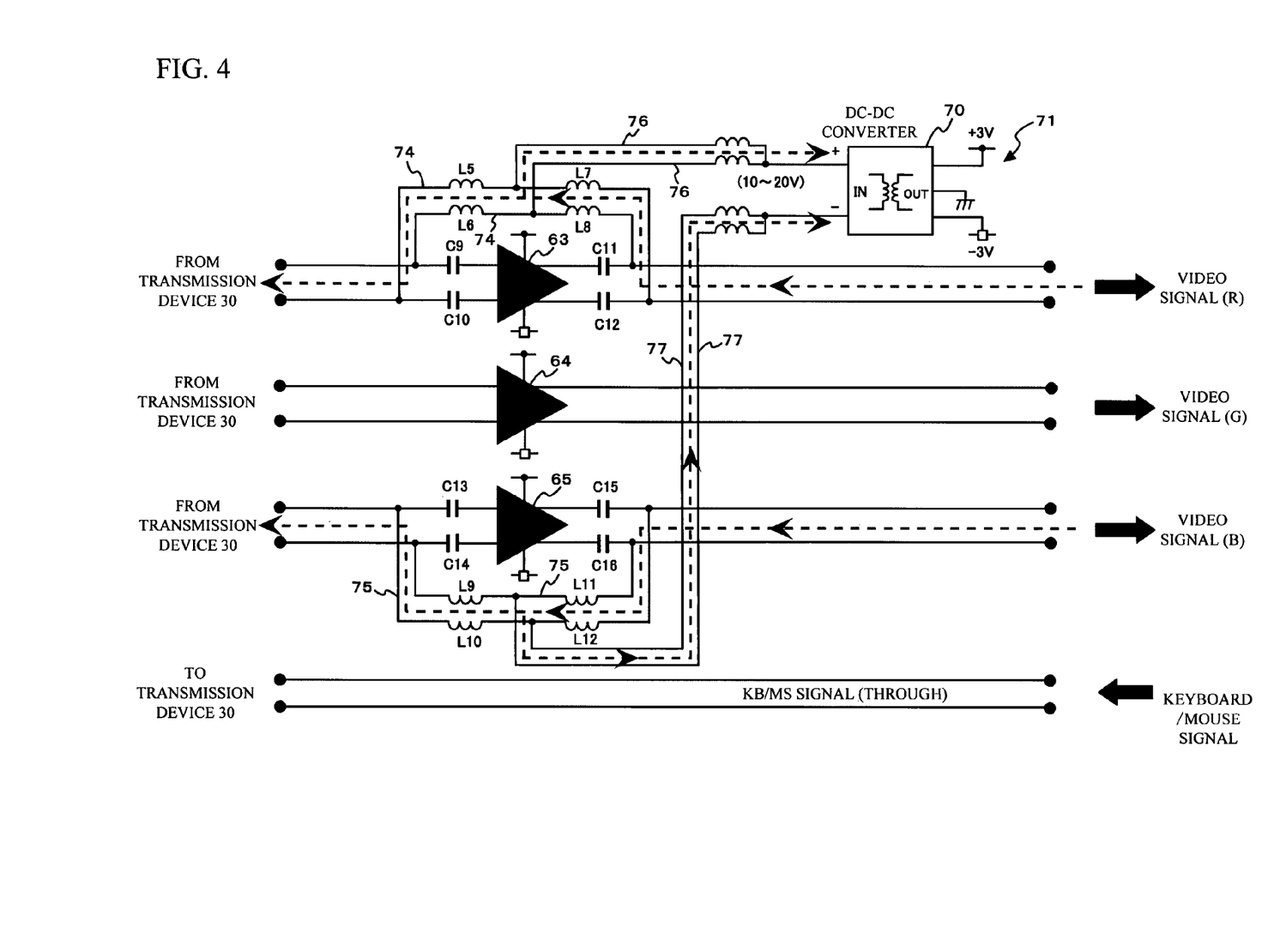
FIG. 4 illustrates the structure of each of the repeater devices other than the repeater device shown in FIG. 3.

Referring now to FIGS. 3 and 4, the structure of each of the repeater devices 51 is described. FIG. 3 shows the structure of the repeater device 51 that inputs signals from the transmission device 30 and repeats the signals to another repeater device 51. FIG. 4 shows the structure of each of the other repeater devices 51.

First, the structure of the repeater device 51 shown in FIG. 3 is described. Communication cables to be used for transmitting video signals are provided for each of the video signals of R, G, and B. The repeater device 51 has the waveform adjusting unit 53 formed with equalizer amplifiers 60, 61, and 62 provided on the communication cables of the respective RGB video signals. The equalizer amplifiers 60, 61, and 62 amplify input signals, and adjust the waveforms of the input signals. The equalizer amplifiers 60, 61, and 62 then output those signals as equalized signals.

Capacitors are provided at each of the input terminals and output terminals of the equalizer amplifiers 60 and 62. Capacitors C1 and C2 are provided at the input terminal of the equalizer amplifier 60, and capacitors C3 and C4 are provided at the output terminal of the equalizer amplifier 60. Likewise, capacitors C5 and C6 are provided at the input terminal of the equalizer amplifier 62, and capacitors C7 and C8 are provided at the output terminal of the equalizer amplifier 62. The communication cables used for transmission of video signals are twisted pair cables. Video signals are transmitted as differential signals with the use of those pair cables. Accordingly, the capacitors are provided on the respective pair cables.

The repeater device 51 receives a power supply from the later described terminating device 52 via communication cables. A direct current is superimposed on each video signal to be transmitted through the communication cables. Therefore, the repeater device 51 has a circuit that separates the direct current from each video signal being transmitted, and outputs a predetermined voltage to an output terminal 71 of the repeater device 51. This circuit has coils L1 and L2 and coils L3 and L4 provided on cables 72 and 73 that connect the above described capacitors C1 through C8 to a voltage converting DC-DC converter 70, and the communication cables to the DC-DC converter 70. The two cables 72 are connected to the two communication cables of the video signal R, and are also connected to the latter sides of the respective capacitors C3 and C4. Likewise, the two cables 73 are connected to the two communication cables of the video signal B, and are also connected to the latter sides of the respective capacitors C7 and C8.

The capacitors C1 through C8 and the coils L1 through L4 are elements for separating the direct current from video signals. The capacitors C1 through C8 prevent the direct current from flowing into the input side of the equalizer amplifiers 60 and 62. The coils L1 through L4 prevent video signals from entering the cable sides.

The communication cables of the video signal R are used for transmitting the direct current on the positive side, and the communication cables of the video signal B are used for transmitting the direct current on the negative side.

FIG. 4 shows the structure of each of the repeater devices 51 other than the repeater device 51 shown at the left end in FIG. 1. Each of those repeater devices 51 also has equalizer amplifiers 63, 64, and 65 on the respective communication cables for the RGB signals.

Capacitors C9 and C10 for separating a direct current are provided at the input end of the equalizer amplifier 63, and capacitors C11 and C12 are provided at the output end of the equalizer amplifier 63. Likewise, capacitors C13 and C14 are provided at the input end of the equalizer amplifier 65, and capacitors C15 and C16 are provided at the output end of the equalizer amplifier 65.

To transmit a direct current supplied from the repeater device 51 on the upstream side to the repeater device 51 on the downstream side, the repeater device 51 shown in FIG. 4 has cables 74 and 75 bypassing the equalizer amplifiers 63 and 65.

The two cables 74 bypassing the equalizer amplifier 63 are connected to the communication cables of the video signal R on the upstream side of the capacitors C9 and C10 and on the downstream side of the capacitors C11 and C12. Likewise, the two cables 75 bypassing the equalizer amplifier 65 are connected to the communication cables of the video signal B on the upstream side of the capacitors C13 and C14 and on the downstream side of the capacitors C11 and C16. The two bypassing cables 74 have coils L5 and L7 connected in series, and coils L6 and L8 connected in series. Likewise, the two bypassing cables 75 have coils L9 and L11 connected in series, and coils L10 and L12 connected in series.

Those capacitors C9 through C16 and the coils L5 through L12 have the same functions as the coils and capacitors of the repeater device 51 shown in FIG. 3.

Cables 76 and 77 for supplying the power source of the device to the DC-DC converter 70 are connected to the bypassing cables 74 and 75. A voltage conversion is carried out by the DC-DC converter 70, and the converted voltage is output to the output end 71.

Next, the terminating device 52 of the repeater unit 50 is described. As shown in FIG. 1, the terminating device 52 includes a waveform adjusting unit 53, a skew adjusting unit 54, and a power supply circuit 55.

As shown in FIG. 1, the terminating device 52 is designed to be connectable to an AC power source. The power supply circuit 55 converts an AC current supplied from the power source into a direct current, and outputs the direct current to the waveform adjusting unit 53.

Figure 5:
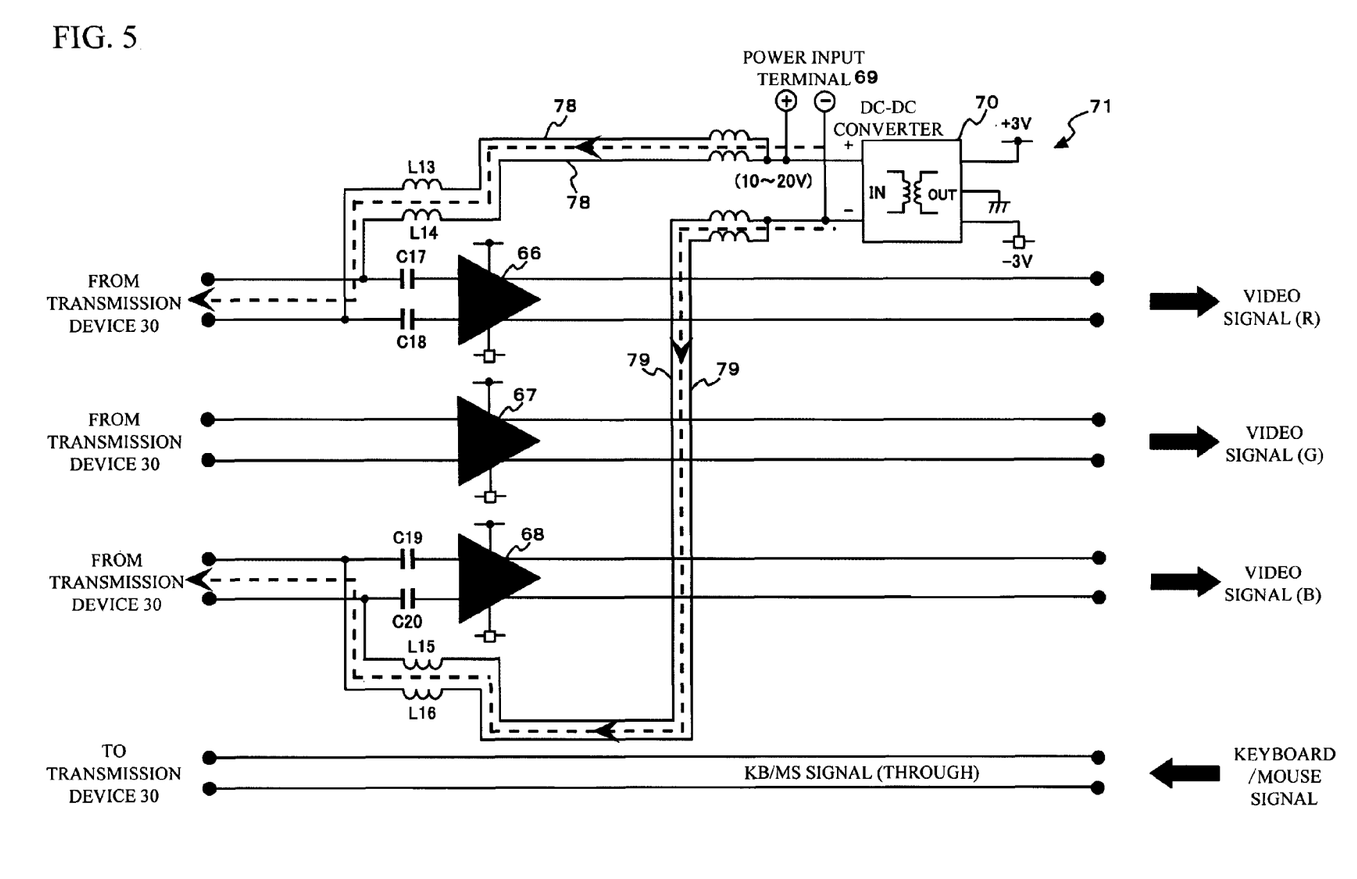
FIG. 5 illustrates the structure of the terminating device.

FIG. 5 shows the structure of the waveform adjusting unit 53. The waveform adjusting unit 53 of the terminating device 52 inputs a direct current supplied from the power supply circuit 55 through a power input terminal 69 shown in FIG. 5, and superimpose the direct current on the R and B video signals. As shown in FIG. 5, the terminating device 52 has cables 78 connected to the communication cables of the video signal R, and cables 79 connected to the communication cables of the video signal B. The direct current that is input from the power input terminal 69 is output to the R and G communication cables through the cables 78 and 79.

Like the above described repeater devices 51, the terminating device 52 has waveform-adjusting equalizer amplifiers 66, 67, and 68 on the respective communication cables of RGB. Capacitors C17 and C18 are connected to the input end of the equalizer amplifier 66, and capacitors C19 and C20 are connected to the input terminal of the equalizer amplifier 68.

Coils S13 and S14 are connected to the two cables 78 connected to the two communication cables of R. Coils 15 and S16 are connected to the two cables 79 connected to the two communication cables of B.

Those capacitors C17 through S20 prevent the direct current from flowing into the equalizer amplifiers 66 and 68, and the coils S13 through S16 prevent video signals from entering the cable sides.

As described above, the repeater unit 50 having the equalizer amplifiers for amplifying signals is provided between the transmission device 30 and the reception device 40 in this embodiment. Accordingly, signals can be repeated from the server device 10 to the console device 20, without signal attenuation. Thus, the connecting distance between the server device and the console device can be made longer.

Also, power can be supplied to the repeater devices through the communication cables. Therefore, it is not necessary to connect all the repeater devices to the power source, and a higher degree of freedom can be allowed for the placement of the repeater devices.

Further, with the use of the communication cables for transmitting video signals, a direct current can be superimposed on each video signal, and be transmitted to the repeater devices. Therefore, it is not necessary to prepare a power source cable. Thus, the device costs can be lowered.

Figure 6:
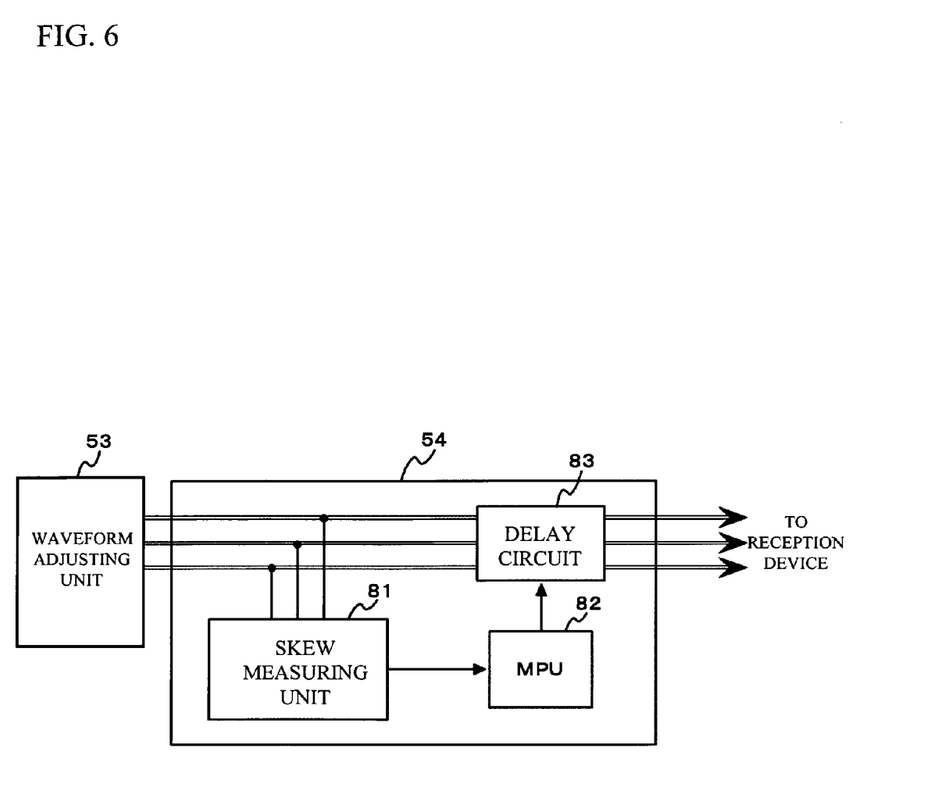
FIG. 6 illustrates the structure of the skew adjusting unit.

Next, skew (delay time) adjustment is described. FIG. 6 shows the structure of the skew adjusting unit 54 of the terminating device 52. As shown in FIG. 6, the skew adjusting unit 54 includes a skew measuring unit 81, a MPU 82, and a delay circuit 83.

Figure 7:
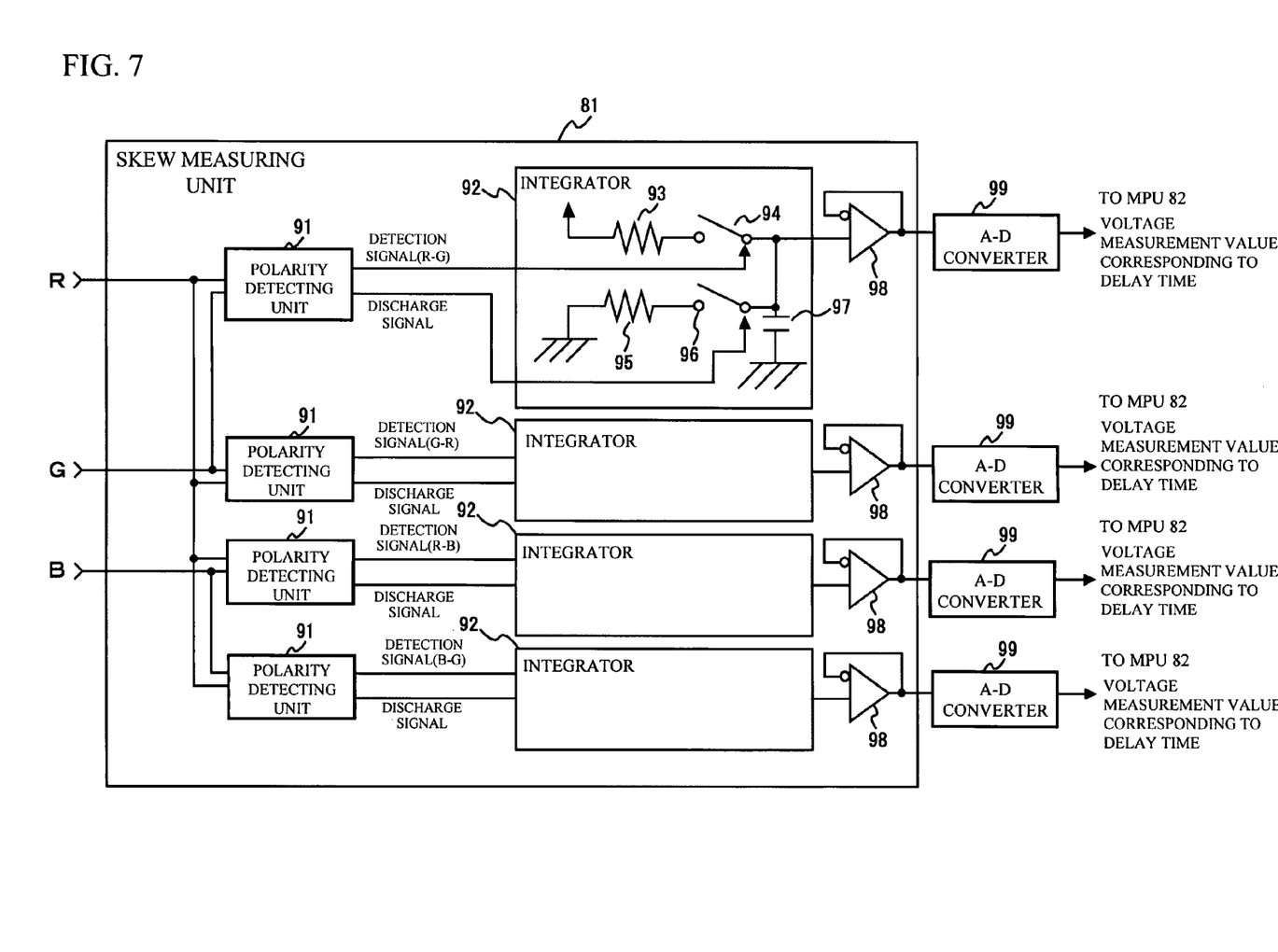
FIG. 7 illustrates the structure of the skew measuring unit.

Referring now to FIG. 7, the structure of the skew measuring unit 81 is described. As shown in FIG. 7, the skew measuring unit 81 includes polarity detecting units 91 that detect the polarity of each subject signal, integrators 92, and operational amplifiers 98.

Each of the polarity detecting units 91 inputs two of the video signals R, G, and B. More specifically, one of the polarity detecting units 91 inputs video signals R and G, another one inputs video signals G and R, another one inputs video signals R and B, and another one inputs video signals B and G. Each of the polarity detecting units 91 compares the difference between the input video signals with a predetermined threshold voltage. When determining that there is a difference in the voltage between the two signals, the polarity detecting unit 91 outputs a detection signal. After a certain period of time has passed since the output of the detection signal, the polarity detecting unit 91 outputs a discharge signal, so as to discharge the charges accumulated in a later described capacitor 97.

Figure 8A:
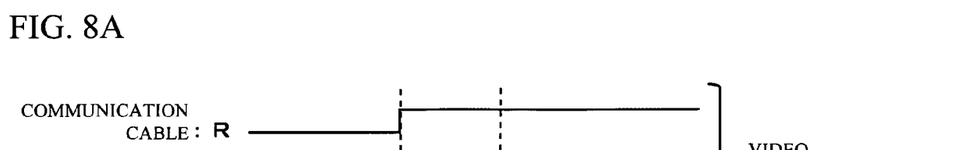
FIGS. 8A through 8D are signal waveform charts illustrating the operation of the skew measuring unit.
Figure 8B:
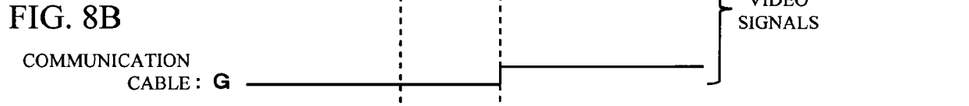
Figure 8C:
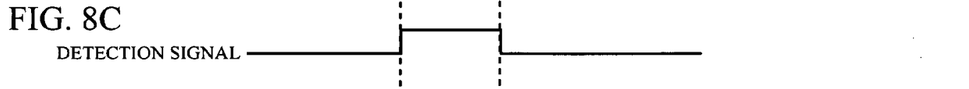

Referring now to FIGS. 8A through 8D, the operation of each of the integrators 92 is described. For example, when a difference in the voltage is caused between image signals of R and G, the polarity detecting unit 91 that inputs the image signals of R and G outputs a detection signal indicating that the polarity has changed, and switches on the switch 94 of the integrator 92. When a difference in the time of arrival is caused between the image signals of R and G as shown in FIGS. 8A and 8B, a detection signal that is at the high level during the time equivalent to the time difference is output from the polarity detecting unit 91 as shown in FIG. 8C.

Figure 8D:
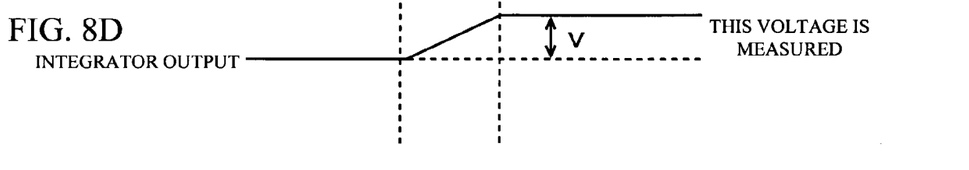

When the detection signal is shifted to the high level, the switch 94 is switched on, and charges are accumulated in the capacitor 97 of the integrator 92 (see FIG. 8D). Accordingly, integration is performed by the integrator 92 during the time equivalent to the difference in the time of arrival between the image signals of R and G. The output of the integrator 92 is detected by an A-D converter 99 via the operational amplifier 98 (for impedance conversion), and the MPU 82 is notified of the detection. The charges accumulated in the capacitor 97 are discharged after a predetermined period of time, upon receipt of the discharge signal from the polarity detecting unit 91.

Figure 9:
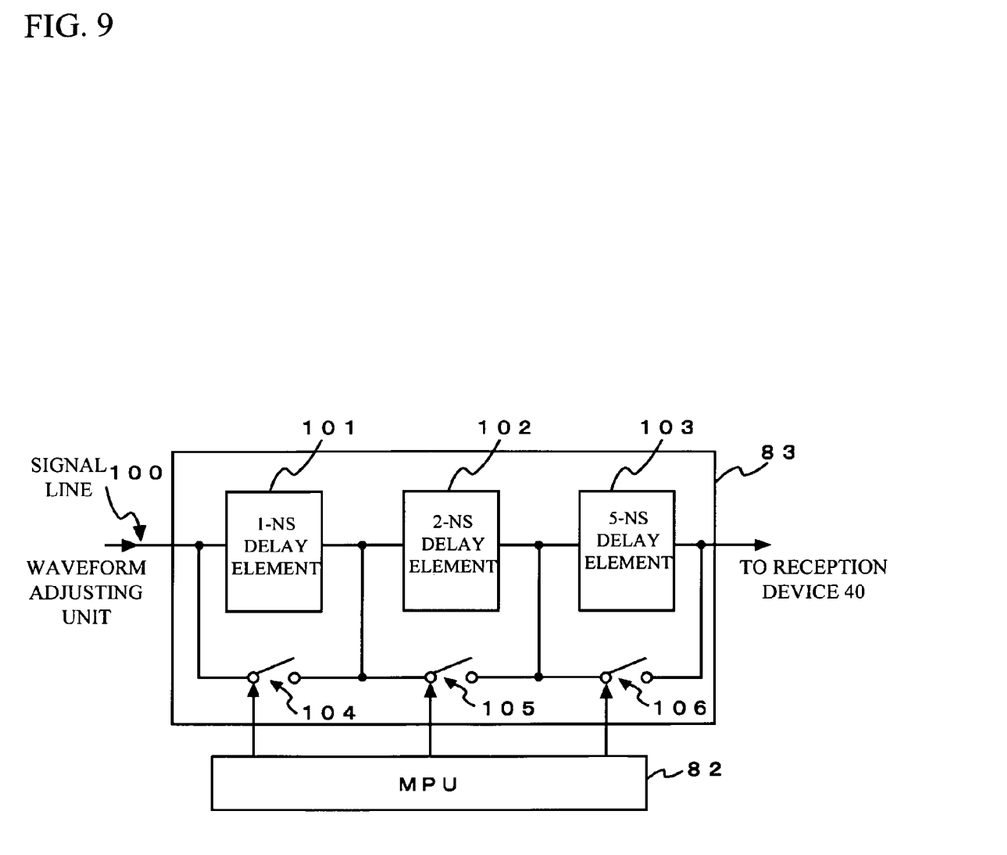
FIG. 9 illustrates the structure of the delay circuit.

Referring now to FIG. 9, the structure and operation of the delay circuit 83 are described. The MPU 82 delays a signal with the delay circuit 83, according to the skew amount measured by the skew measuring unit 81. The delay circuit 83 shown in FIG. 9 is provided on each of the signal lines of R, Q and B, and delays a signal in accordance with an instruction from the MPU 82.

As shown in FIG. 9, the delay circuit 83 includes delay elements 101, 102, and 103 provided on a signal line 100, and switches 104, 105, and 106 that switch on and off a bypass designed to outputting a signal without the delay elements 101, 102, and 103. In this embodiment, 1-ns, 2-ns, and 5-ns delay elements are provided. However, delay elements of the present invention are not limited to those delay elements, and changes may be made to them.

Figure 10:
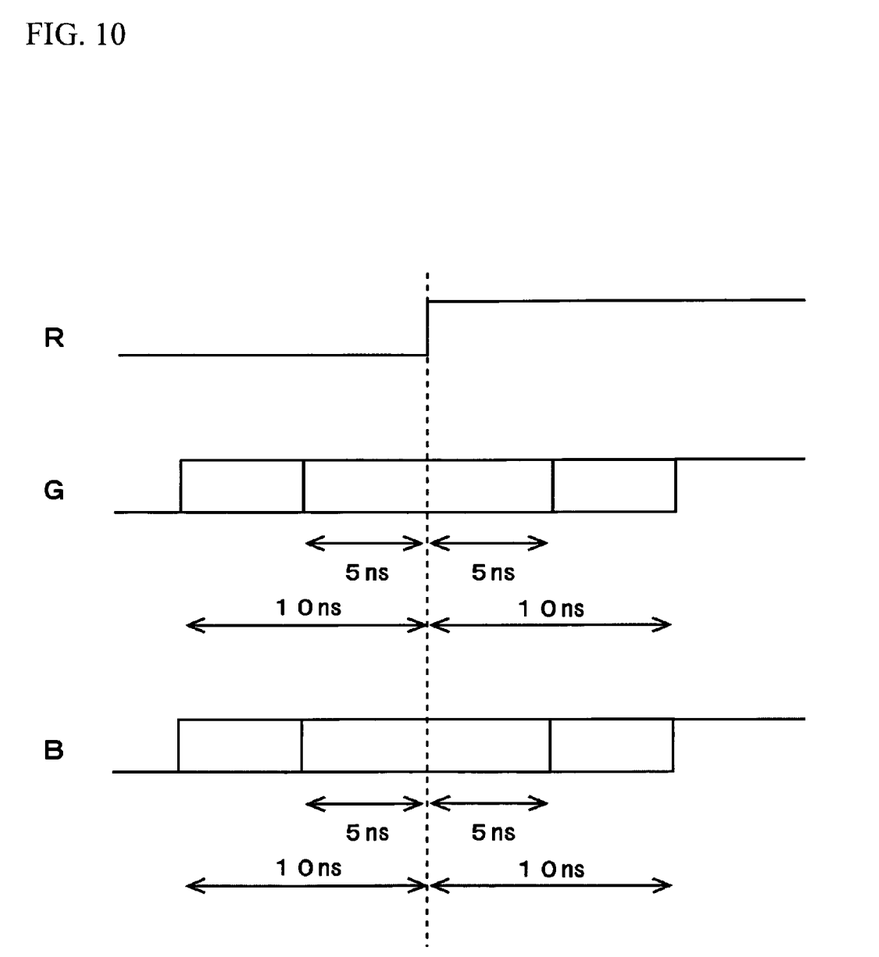
FIG. 10 illustrates the delay settings between the reference communication cable and the other communication cables.

The MPU 82 sets a transmission line as a reference transmission line in advance, and adjusts the signals on the other transmission lines so as to cause a delay of ±5 ns or ±10 ns with respect to the signal on this reference transmission line (see FIG. 10). For example, in a case where a delay of 5 ns with respect to the line on the reference transmission line is to be caused, the switches 104 and 105 are switched on, so as to let signals pass through only the 5-ns delay element and output the delayed signals. Also, the signal on the reference transmission line is delayed by 10 ns, and the signals on the other transmission lines are delayed by 5 ns, so as to output the signals on the other transmission lines earlier than the signal on the reference transmission line. As described above, the MPU 82 controls the switching on and off of the switches 104, 105, and 106, according to the delayed time measured by the skew measuring unit 81. In this manner, signals that are delayed by a predetermined period of time can be output.

Figure 11:
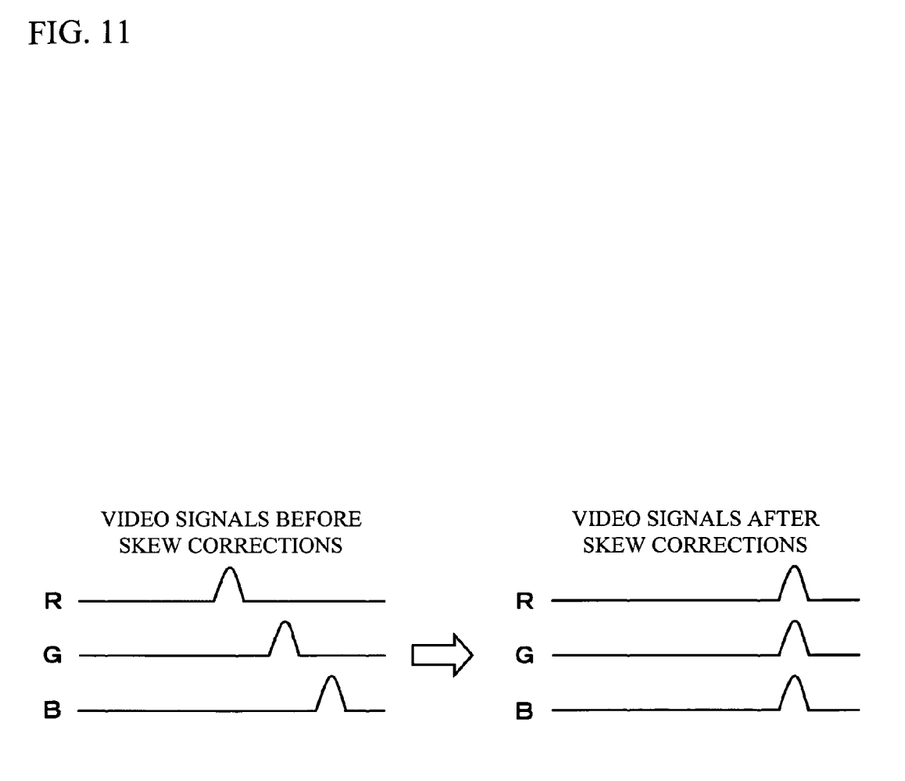
FIG. 11 show signals before and after skew corrections.

As described above, the skews caused among the signals on the transmission lines of R, Q and B are measured, and the differences in the time of arrival among the signals are corrected. In this manner, the differences among the signals R, G, and B can be corrected as shown in FIG. 11. Thus, a high-quality image without a color shift can be displayed on the display.

The above described embodiment is a preferred embodiment of the present invention. However, it should be noted that the present invention is not limited by the embodiment, and various changes and modifications may be made to it within the scope of the invention. For example, the transmission device 30 may also have the functions of each repeater device 51, and the reception device 40 may also have the functions of the terminating device 52.

The present invention is based on Japanese Patent Application No. 2007-088878 filed on Mar. 29, 2007, the entire disclosure of which is hereby incorporated by reference.

What is claimed is:

1. A repeater device that is placed between a transmission device connected to a server device and a reception device connected to a console device that controls the server device, the repeater device repeating a signal between the transmission device and the reception device, the repeater device comprising:
   an equalizer amplifier that amplifies a signal that is received from the transmission device or another repeater device; and
   a separating unit that separates a direct current from a video signal that is output from the server device such that one or more capacitors prevent the direct current from flowing into the equalizer amplifier and that one or more coils prevent the video signal from flowing to an output terminal for outputting a predetermined voltage, the direct current being received through a cable used for transmitting the video signal.

2. The repeater device as claimed in claim 1, wherein the direct current is converted to supply the repeater device with a power.

3. A repeater system that is placed between a transmission device connected to a server device and a reception device connected to a console device that controls the server device, the repeater system repeating a signal between the transmission device and the reception device,
   the repeater system comprising:
   a second repeater device that includes an equalizer amplifier that amplifies a signal received from the transmission device or another device, and a separating unit that separates a direct current from a video signal that is output from the server device, the direct current being received through a cable used for transmitting the video signal; and
   a first repeater device that includes an equalizer amplifier that amplifies a signal received from the second repeater device, a skew adjusting unit that adjusts a skew of the video signal transmitted through a plurality of cables, and a power supply unit that supplies the direct current to the second repeater device with the use of the cable used for transmitting the video signal, upon receipt of a power supply from a power source device.

4. A repeater device that is placed between a transmission device connected to a server device and a reception device connected to a console device that controls the server device, the repeater device repeating a signal between the transmission device and the reception device, the repeater device comprising:
   an equalizer amplifier that amplifies a signal that is received from another repeater device connected to the transmission device;
   a skew adjusting unit that adjusts a skew of the video signal; and
   a power supply unit that supplies a direct current to the another repeater device with the use of the cable used for transmitting a video signal from the transmission device to the reception device via the another repeater, upon receipt of a power supply from a power source device.

5. A repeater system that is placed between a transmission device connected to a server device and a reception device connected to a console device that controls the server device, the repeater device repeating a signal between the transmission device and the reception device, the repeater system comprising:
   a second repeater device that includes an equalizer amplifier that amplifies a signal received from the transmission device or another device, and a separating unit that separates a direct current from a video signal that is output from the server device, the direct current being received through a cable used for transmitting the video signal; and
   a first repeater device that includes an equalizer amplifier that amplifies a signal received from the second repeater device, and a power supply unit that supplies the direct current to the second repeater device with the use of the cable used for transmitting the video signal, upon receipt of a power supply from a power source device.

* * * * *